Sept. 16, 1952 D. HAWKS, JR., ET AL 2,610,408
MEASURING MACHINE ATTACHMENT
Filed Sept. 8, 1947

INVENTORS.
DOUGLASS HAWKS JR.
EGBERT VAN HAAFTEN
BY
*m. w. Gould.*
ATT Y.

Patented Sept. 16, 1952

2,610,408

UNITED STATES PATENT OFFICE 2,610,408

MEASURING MACHINE ATTACHMENT

Douglass Hawks, Jr., and Egbert Van Haaften, Lancaster, Pa., assignors to Hamilton Watch Company, Lancaster, Pa.

Application September 8, 1947, Serial No. 772,756

1 Claim. (Cl. 33—167)

This invention is directed to an attachment to be used with the type of micrometer which provides a measurement between two known points and under constant pressure.

The micrometer for which the attachment is made is that type of measuring machine which consists of a bed, a micrometer head stock with a short spindle travel and a pressure tail stock which can be moved to any position along the bed. The advantage of measuring with a micrometer of this type is that the pressure tail stock provides a fixed pressure against the work so that each measurement is made with exactly the same amount of pressure against the work. These machines are designed for external measurement, the two anvils being brought together with the work between to accurately measure the length of the workpiece.

The attachment which forms the subject of this invention provides a means for making internal measurements on the same machine and using the pressure responsive needle to control the pressure in an identical manner as in making external measurements.

The object of the present invention is to provide an accurate means for converting an external measuring instrument into a combination external and internal measuring instrument.

It is a further object of the present invention to provide attachments which may be temporarily installed on the machine without in any way changing the construction of the machine and which will provide, within limits of the measuring machine, accurate means for making internal measurements.

It is a further object of the present invention to provide attachments carrying two upstanding semicircular projections which form the contact points for making the internal measurements and which are arranged so that the pressure used to actuate the indicating needle is directed the same for internal measurments as for external measurements.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is disclosed in the following drawing in which.

Figure 1:
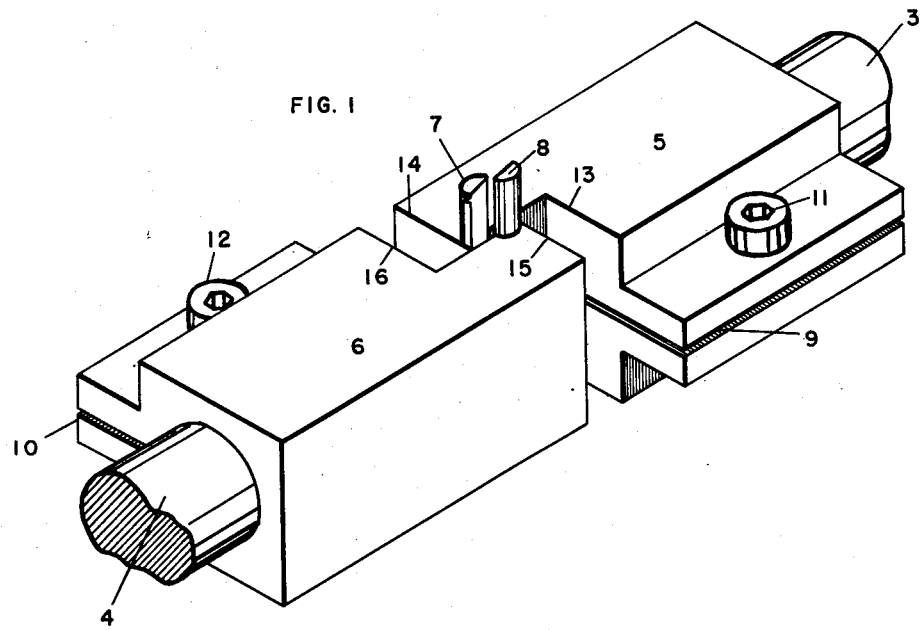
Figure 1 is a perspective of the attachments as applied to the anvils of the micrometer.

In the drawing in which the attachment is shown attached to a micrometer of the type known as a super micrometer, only a small part of which is illustrated, the head stock anvil is indicated at 3 and the tail stock anvil at 4. In ordinary use these two anvils are caused to approach each other by a screw adjustment until each contacts the article to be measured and at a predetermined pressure. This will give an exterior measurement at a predetermined pressure which is indicated on the super micrometer.

The invention consists of a pair of duplicate anvils 5 and 6 which fit over the head stock and tail stock anvils of the super micrometer and which carry upstanding projections 7 and 8 respectively for making internal measurements. Each of the anvils 5 and 6 is formed with a partial central internal bore to receive the head stock and tail stock anvils and slots 9 and 10 which are used to secure the anvils 5 and 6 on the head stock and tail stock anvils 3 and 4 through the screws 11 and 12.

The anvils are formed with step portions 13, 14—15, 16 respectively, the portion 15 abutting the step 13 and the portion 14 abutting the step 16 of the anvils. It is, of course, possible to make the steps of any size so that different sizes of internal measurements could be made giving an unlimited range. The upstanding projections 7 and 8 of the anvils 5 and 6 respectively are formed semicircular in cross section with a flat leading edge 17 designed to give clearance and with rounded or cylindrical surfaces adapted to contact the object to be measured. These upstanding projections are set with their flat sides 18 at an angle to the longitudinal axis of the super micrometer and to the movement of the anvils 5 and 6.

Figure 2:
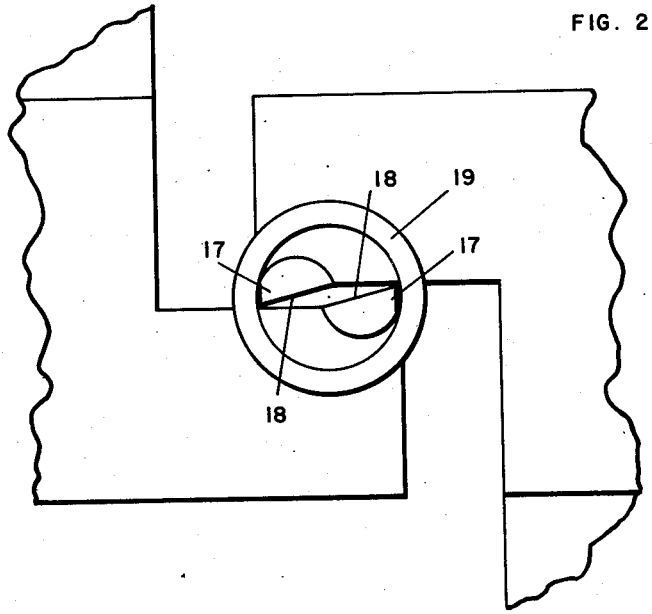
Figure 2 is a detail of the internal contacting projections of the attachments.

Referring particularly to Figure 2, a ring 19 of which the internal measurement is desired is placed over the upstanding projections when in a closed position and the projections moved apart which is done by moving the anvils together. This movement brings the surfaces in contact with the internal surface of the ring and establishes a contact pressure against the anvils and in the same manner as when making an external measurement without the anvils 5 and 6. The surfaces have the same centerline and this centerline is parallel to the centerline of the head stock anvils and the tail stock anvils and thus transmit all of the contact pressure along these anvils.

The size of an object to be measured is, of course, limited by the depth of the step in each of the anvils and by the diameter of projections 7 and 8 but as this is a matter of construction, the use of such anvils for making internal measurements is practically unlimited as to size.

What is claimed is:

An attachment for a micrometer of the type having an indicating hand and a constant pressure requirement, comprising a pair of detachable anvils adapted to be positioned on the head stock and tail stock anvils of said micrometer, said detachable anvils being formed with an internal bore and a connecting slot, said bore receiving the head stock and tail stock anvils, means passing through opposite sides of said slot to draw the sides of the slot together to secure the detachable anvils on said head stock and tail stock anvils, a projecting step and a receding step formed on each of the detachable anvils and arranged so that the projecting step of one anvil interfits into the receding step of the other anvil and semicylindrical upstanding projections carried at the inner forward end of each of the projecting steps, said semicylindrical projections forming a complete cylinder when the ends of the projecting steps of the detachable anvils are substantially in line, said position corresponding to the zero point of the micrometer, further movement of said detachable anvils toward each other causing the projecting step of one anvil to further interfit into the receding step of the other anvil and serving to move the semicylindrical projections away from each other for making internal measurements, the contacting pressure being directed against the head stock and tail stock anvils in the same manner as when making external measurements.

DOUGLASS HAWKS, Jr.
E. VAN HAAFTEN.

REFERENCES CITED

The following references are of record in the file of this patent:

UNITED STATES PATENTS

| Number | Name | Date |
|---|---|---|
| 874,197 | Heym | Dec. 17, 1907 |
| 1,333,453 | Sardo et al. | Mar. 9, 1920 |
| 1,392,313 | Fallow | Oct. 4, 1921 |
| 2,216,796 | Aller | Oct. 8, 1940 |
| 2,427,924 | Rose | Sept. 23, 1947 |

FOREIGN PATENTS

| Number | Country | Date |
|---|---|---|
| 376,369 | Germany | May 28, 1923 |